Oct. 21, 1924.

A. R. THOMPSON

CAN FEEDER

Filed May 16, 1923

Inventor
Albert R. Thompson
By Booth & Booth
attorneys.

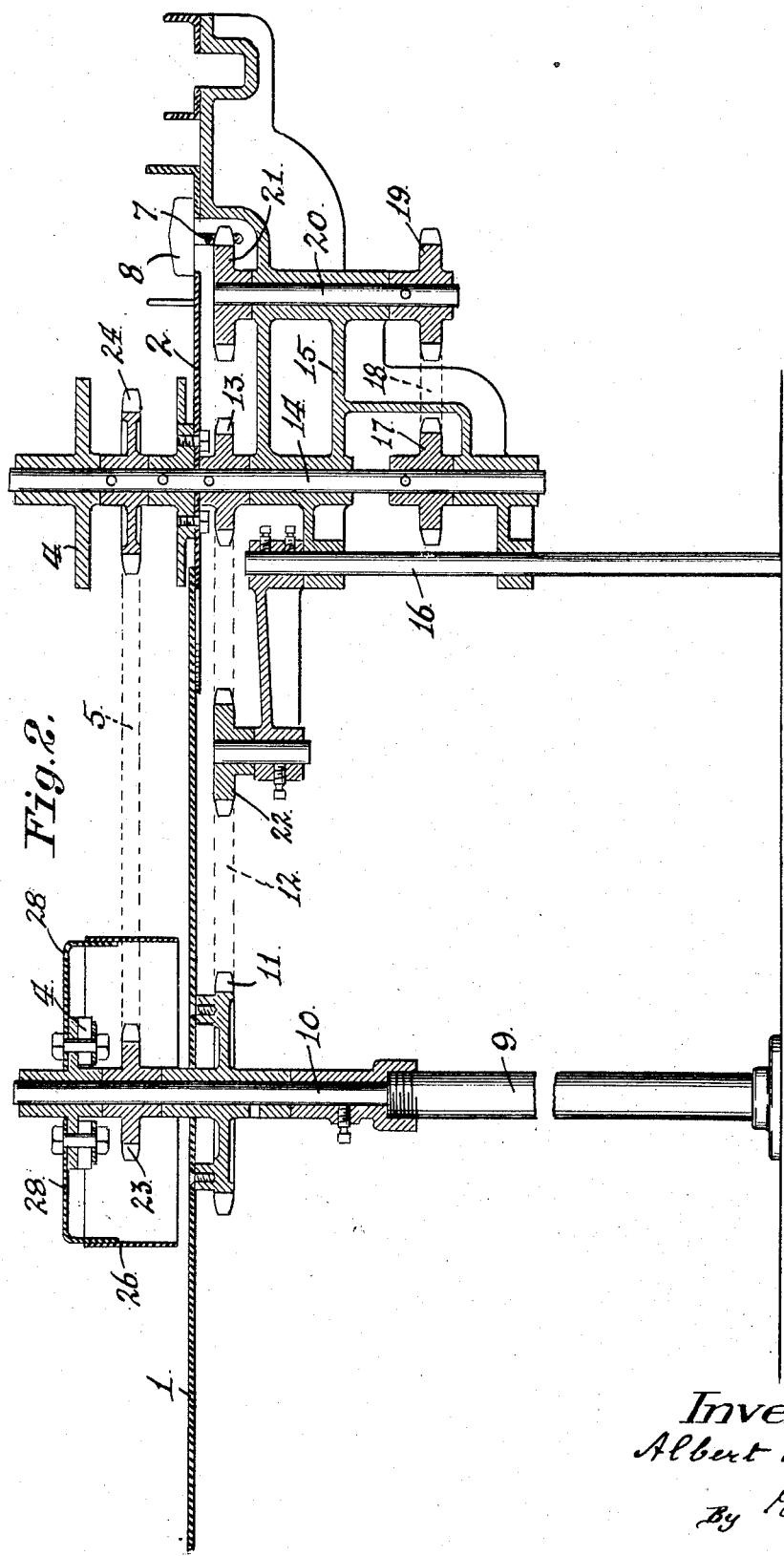

Patented Oct. 21, 1924.

1,512,652

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

CAN FEEDER.

Application filed May 16, 1923. Serial No. 639,437.

*To all whom it may concern:*

Be it known that I, ALBERT R. THOMPSON, a citizen of the United States, residing at San Jose, in the county of Santa Clara and State of California, have invented certain new and useful Improvements in Can Feeders, of which the following is a specification.

My invention relates to devices for feeding cans. It is especially adapted for use in the canning art under circumstances requiring a continuous supply of individual cans to a traveling succession of conveyer pockets or holding spaces by which said cans are carried to a given machine or destination. The following example will serve to illustrate one such application. Cans after being filled with the previously washed solid comestible, and with their tops still open, are successively placed upright in the pockets or spaces formed between the flights of a traveling conveyer, and by this conveyer they are carried in continuous procession to a draining machine intercepting their course, and by which they are temporarily removed from the conveyer, inverted to relieve them of surplus moisture and replaced upright on the conveyer, and then continued onward to the syruper. The necessity for timely accuracy in this operation has heretofore required, in practise, the labor and time to manually supply the traveling succession of conveyer flights or pockets with the individual cans. By my present invention I change this practice with resulting economy in time and labor, by the provision of a mechanical feeder adapted to automatically select from an unorganized can crowd an orderly procession of cans and feed them accurately and in timely succession to the traveling series of conveyer pockets. Other examples of the useful application of my invention might be given, and may occur to those skilled in the art, but the foregoing is sufficient to make it clear that the essential feature of my invention lies in its capability of initially receiving an indiscriminate, unorganized crowd or group of cans, which on this account may be easily supplied with a minimum of time and labor, and then selectively reducing said crowd to an orderly file or procession adapted to be continuously and timely fed to means for carrying the cans to a predetermined destination.

With this object in view, my invention consists in the novel can feeder which I shall hereinafter fully describe, by reference to the accompanying drawings, it being understood that changes in details of construction and arrangement may be made without departing from the spirit of the invention as defined by the claims herein.

In the drawings—

Fig. 2 is a sectional elevation on the line 2—2 of Fig. 1, the arcuate stop arm being omitted.

Fig. 3 is an end elevation of the arcuate stop arm 4.

Fig. 4 is a cross section of the same showing the relationship of the transfer conveyer thereto, taken on line 4—4 of Fig. 1.

Figure 1:
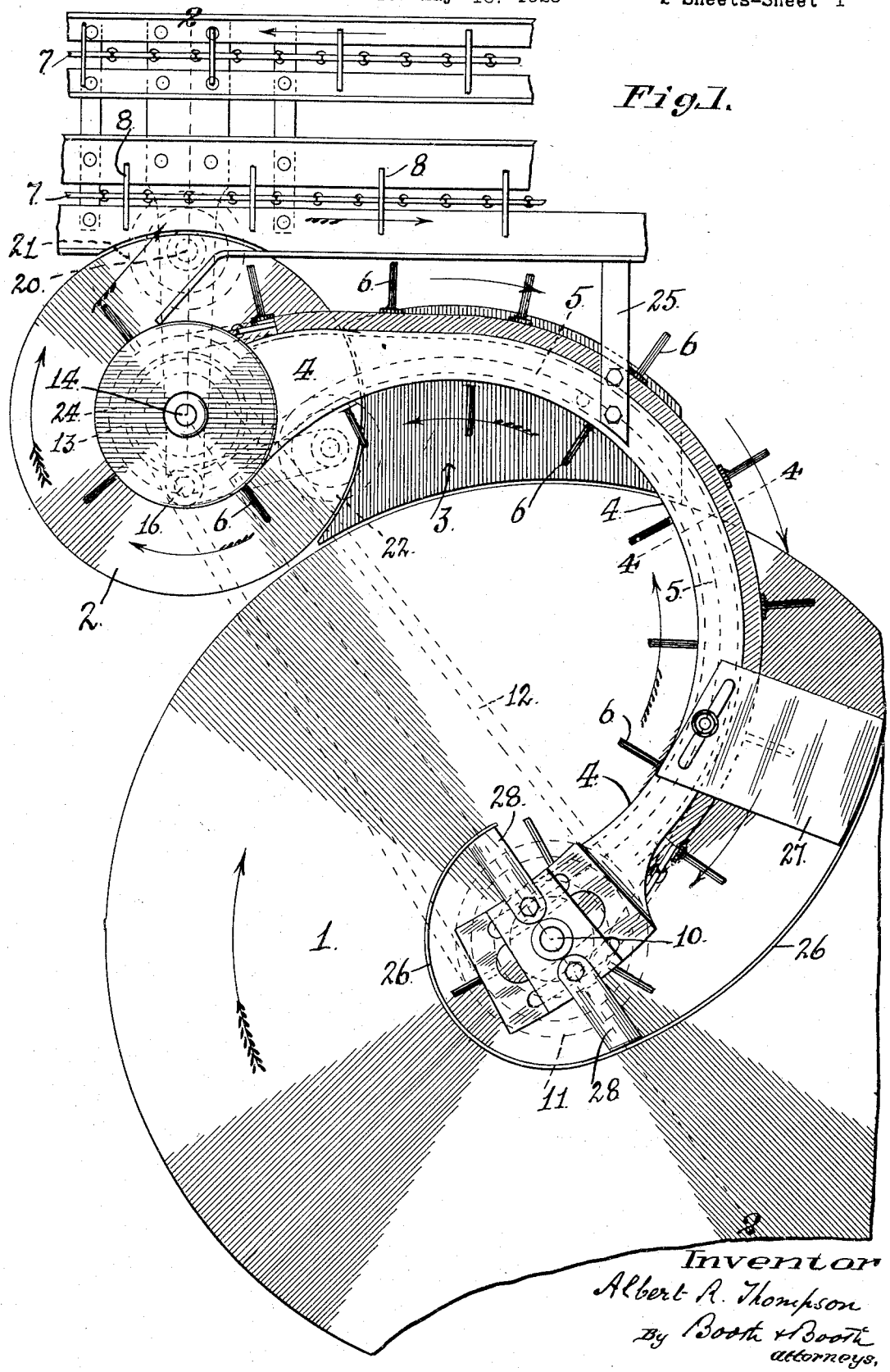
Fig. 1 is a top plan of my can-feeder.

1 is a rotatable, rimless, receiving table which revolves in the direction indicated by the arrow in Fig. 1.

2 is a rimless transfer table which is best, though not necessarily a rotatable one, revolving in the direction of the arrows, and 3 is an intermediate fixed table. Overlying all the tables with its ends fixed in the axes of the two revoluble tables is an arcuate stop and guide arm 4, in which is mounted an endless traveling conveyer 5, the flights 6 of which project from the sides of the arm and form on its concave side a succession of pockets for the reception of the cans. The concave side of the arm faces the direction of movement of the table 1 as seen in Fig. 1 and the direction of travel of the flights 6 of the conveyer 5 on said concave side is from the center of said table to and beyond its periphery over the fixed table 3 and thence over the table 2 to the axis thereof, and thence back again, as shown by the arrows in Fig. 1. 7 is the main conveyer to the predetermined destination of the cans, say for example, the can drainer and the following syruper, neither of which is it necessary to show. The main conveyer 7 is so related to the transfer table 2 that its flights 8, successively come into timely communicating relation with the transfer conveyer flights 6 as said latter flights round their terminal in the axis of the transfer table 2 on their return course.

Before proceeding with the description of the machine in the matters of details of mounting and driving, it will be well at this point to describe the essential operation of the parts thus far disclosed.

The attendant with his hand truck laden with trays of cans filled with the solid comestible, approaches the receiving table 1, and taking up the trays successively from the truck, slides the cans from their open tray-sides onto said table. The cans are upright and they lie on the table without regard to order, in an indiscriminate crowd. It will, therefore, be apparent that this method of supplying the receiving table may be easily and rapidly accomplished. The revolving receiving table advances the cans until the front members of the crowd approaching the concave face of the stop arm 4, are arrested and by contact therewith tend to be directed inwardly on the table, so that individual cans enter between the flights 6 of the transfer conveyer 5. These cans now form an orderly continuous file, which is advanced by said flight and swept off the rimless table 1 and over the fixed table 3, and to and upon the rimless transfer table 2, and thence in timely succession to and into the pockets formed by the flights 8 of the main conveyer 7.

Thus as the receiving table 1 continuously moves the unorganized crowd of cans forward, the foremost individuals find places in the spaces between the flights 6 of the transfer conveyer 5 and are swept off in a single file, while other cans behind, with no tendency towards the rimless edge of the table, constantly take places in the file to the rear. Thus no rim or barrier is required on the table to separate the orderly file which is being swept off, from the crowd behind, and there is, consequently, no tendency to jam, such as would be present if the table had a rim. The transfer table 2, by its rotation obviates the necessity of providing it with a rim, and the cans are therefore smoothly advanced to the main conveyer.

In the present form of the apparatus the structure as a whole is as follows:—Referring to Fig. 2, 9 is a pillar in which is carried a spindle 10, upon which the receiving table 1 is mounted for rotation, said table being driven by a sprocket 11 from a chain 12 extending to a sprocket 13 on a shaft 14, which is mounted in a bracket 15 carried by a standard 16 rising from the floor. The shaft 14 carries and rotates the transfer table 2, and said shaft is driven by a sprocket 17 from a chain 18 the other bight of which engages a sprocket 19 on a shaft 20 which carries also a sprocket 21, the latter being driven by the main conveyer 7, which is itself driven by power led in to the general assembly at a point unnecessary to show. 22 is a tightener sprocket for the chain 12. The transfer conveyer is driven from the shaft 14 by means of the terminal sprockets 23 and 24. The arcuate stop arm 4 is carried at one end by the spindle 10 and at the other end is supported upon the shaft 14. Between these ends it is further supported by an arm 25 from the frame of the main conveyer assembly, Fig. 1. 26 is a guard member protecting the transfer conveyer in its travel about the axis of the receiving table, and serving to prevent interference with the crowd of cans, and to direct said crowd towards the functional concave face of the stop arm, Fig. 1. This guard member is adjustably carried at one end by the stop arm, by means of the brace 27, and at the other end by the straps 28.

I claim:

1. A can-feeder comprising a rotatable table to receive and advance an unorganized crowd of cans; and an independently traveling conveyer overlying the table with pockets to receive the advanced cans, said pockets functionally traveling from the table axis to and beyond the table perimeter in a curved path concaved to face the direction of the can advance, whereby cans are taken from the unorganized crowd and carried off the table in file.

2. A can-feeder comprising a rotatable rimless table to receive and advance an unorganized crowd of cans; and an independently traveling conveyer with spaced flights overlying the table and functionally moving from the axis to and beyond the perimeter thereof in a curved path concaved to face the advancing can crowd, whereby cans are taken in the spaces between the flights and swept from the rimless table in file.

3. A can-feeder comprising a rotatable rimless table to receive and advance an unorganized crowd of cans; a fixed stop overlying the table and extending from its axis to and beyond its perimeter, said stop being curved with its concave side facing the advancing can crowd; and an independently traveling conveyer associated with said stop and moving in a path concentric therewith, said conveyer having spaced flights projecting over the table from the concave face of the stop and adapted to receive between them cans from the advancing crowd and sweep them from the rimless table in file.

4. A can-feeder comprising a rotatable rimless table to receive and advance an unorganized crowd of cans; a fixed stop overlying the table and extending from its axis to and beyond its perimeter, said stop being curved with its concave side facing the advancing can crowd; an independently traveling conveyer associated with said stop and moving in a path concentric therewith, to receive and sweep the cans from the rimless table in file; a second table underlying said stop and conveyer and upon which the file of cans is swept from the first table; and a traveling main conveyer associated with the second table and timed to receive the cans in orderly succession from the first conveyer.

5. A can-feeder comprising a rotatable rimless table to receive and advance an unorganized crowd of cans; a fixed stop overlying the table and extending from its axis to and beyond its perimeter, said stop being curved with its concave side facing the advancing can crowd; an independently traveling conveyer associated with said stop and moving in a path concentric therewith, to receive and sweep the cans from the rimless table in file; a second rotatable rimless table underlying said stop and conveyer and upon which the file of cans is swept; and a traveling main conveyer associated with the second table and timed to receive the cans in orderly succession from the first conveyer.

In testimony whereof I have signed my name to this specification.

ALBERT R. THOMPSON.